(12) United States Patent
Bethards

(10) Patent No.: US 10,906,167 B2
(45) Date of Patent: Feb. 2, 2021

(54) COMPACT PORTABLE DRILL PRESS ATTACHMENT FOR HAND HELD DRILLS

(71) Applicant: Jason W Bethards, Granbury, TX (US)

(72) Inventor: Jason W Bethards, Granbury, TX (US)

( * ) Notice: Subject to any disclaimer, the term of this patent is extended or adjusted under 35 U.S.C. 154(b) by 0 days.

(21) Appl. No.: 15/732,971

(22) Filed: Jan. 22, 2018

(65) Prior Publication Data
US 2019/0224838 A1 Jul. 25, 2019

(51) Int. Cl.
B25H 1/00 (2006.01)
B23B 45/00 (2006.01)

(52) U.S. Cl.
CPC ......... B25H 1/0057 (2013.01); B23B 45/003 (2013.01); B23B 2270/08 (2013.01); Y10S 408/712 (2013.01); Y10T 408/5626 (2015.01); Y10T 408/675 (2015.01)

(58) Field of Classification Search
CPC .............. B25H 1/0057; Y10S 408/712; Y10T 408/5626; Y10T 408/5647; B23B 45/003
See application file for complete search history.

(56) References Cited

U.S. PATENT DOCUMENTS

| | | | | |
|---|---|---|---|---|
| 1,797,361 A * | 3/1931 | Park | ..................... | B25H 1/0057 408/102 |
| 2,466,965 A * | 4/1949 | Pitts | ..................... | B25H 1/0057 408/99 |
| 2,629,267 A * | 2/1953 | Hart | ..................... | E21B 19/08 408/100 |
| 2,696,129 A * | 12/1954 | Riblet | ................. | B25H 1/0057 408/99 |
| 2,737,065 A * | 3/1956 | Piersall | ................ | B25H 1/0042 408/712 |
| 2,748,628 A * | 6/1956 | Mason | ..................... | B23Q 1/28 408/712 |
| 2,925,001 A * | 2/1960 | Johnson | .................... | B27C 3/08 144/104 |
| 2,973,673 A * | 3/1961 | Grau | .................... | B25H 1/0064 408/712 |
| 2,994,235 A * | 8/1961 | Rise | .................... | B23B 51/0054 408/112 |
| 3,060,769 A * | 10/1962 | Heider | ................. | B25H 1/0064 192/107 T |
| 3,077,129 A * | 2/1963 | Carles | ................. | B25H 1/0078 408/112 |
| 3,089,357 A * | 5/1963 | Grau | ....................... | B23Q 5/50 408/100 |
| 3,242,773 A * | 3/1966 | Van Praag | ........... | B25H 1/0078 408/112 |
| 3,538,794 A * | 11/1970 | Grundmeyer | ........ | B25H 1/0057 408/92 |
| 4,576,529 A * | 3/1986 | Forrer | .................. | B25B 1/2405 29/560.1 |

(Continued)

Primary Examiner — Eric A. Gates

(57) ABSTRACT

This accessory, for a hand held drill, turns the drill into a portable drill press. To use this portable drill press, place the drill bit where you want it. Lean the drill forward until the base slides under the metal your drilling. The base is a lever and the drill and bit swings off it. The base holds the drill in place at a angle. When the drill is pulled straight, everything tightens up. The metal and the drill bit are pushed together with leverage. Turn the drill on and drill the hole by just holding the drill straight. This portable drill press is faster and easier to use, than drilling by hand.

1 Claim, 3 Drawing Sheets

(56) References Cited

U.S. PATENT DOCUMENTS

| | | | | |
|---|---|---|---|---|
| 5,314,271 A | * | 5/1994 | Christiano | B25H 1/0057 408/111 |
| 5,885,036 A | * | 3/1999 | Wheeler | B23Q 9/0028 408/1 R |
| 7,226,252 B2 | * | 6/2007 | Glodowski | B25H 1/0064 408/1 R |
| 2004/0202516 A1 | * | 10/2004 | Lanser | B23Q 9/02 408/1 R |

* cited by examiner

COMPACT PORTABLE DRILL PRESS ATTACHMENT FOR HAND HELD DRILLS

CROSS-REFERENCE TO RELATED APPLICATIONS

This tool will be used by people that fabricate metal. Any body that needs a hole drilled will use this tool.

BACKGROUND

This drill press, will be used by people that work with metal.

Drilling holes can take lots of energy and time. By attaching this drill press attachment to a hand held drill, you can drill easier and faster.

This is a portable drill press that can fit in tight spots. There are no handles to hold onto you can keep both hands on the drill, for better control.

This drill press hooks on to the back of metal. The base pulls the metal to the drill bit. When you hook onto the metal, the drill bit is pressed firmly against the steel. The drill sits at a angle.

When the drill is pulled straight, the drill bit pushes tighter against the steel. To drill a hole all you do is hold the drill straight.

SUMMARY

This is an attachment that fits on a hand held drill. This attachment will turn a hand held drill into a drill press.

This attachment uses leverage to help drill a hole. By not having to turn a handle to tighten the drill bit against the steel, the drill press is smaller and can fit in tight spots. Being able to hold both hands on the drill, makes the drill more stable. This portable drill press makes drilling holes easier and faster. It requires very little energy to use.

BRIEF DESCRIPTION OF THE FIGURES

This attachment turns a hand drill into a portable drill press. When this attachment is attached to a hand drill, it is easier to place the drill bit exactly where you want to drill. Lean the drill forward until the base hooks under the metal that is being drilled. The drill is now hooked to the metal at an angle. Start pulling the drill back straight. As the drill gets straighter, pressure is applied to the drill bit. When the operator pulls the drill straight, leverage is applied to the drill bit. This leverage helps to drill the hole more easily.

BRIEF DESCRIPTION OF THE DRAWINGS

FIG. 1,2,3

Figure 1:
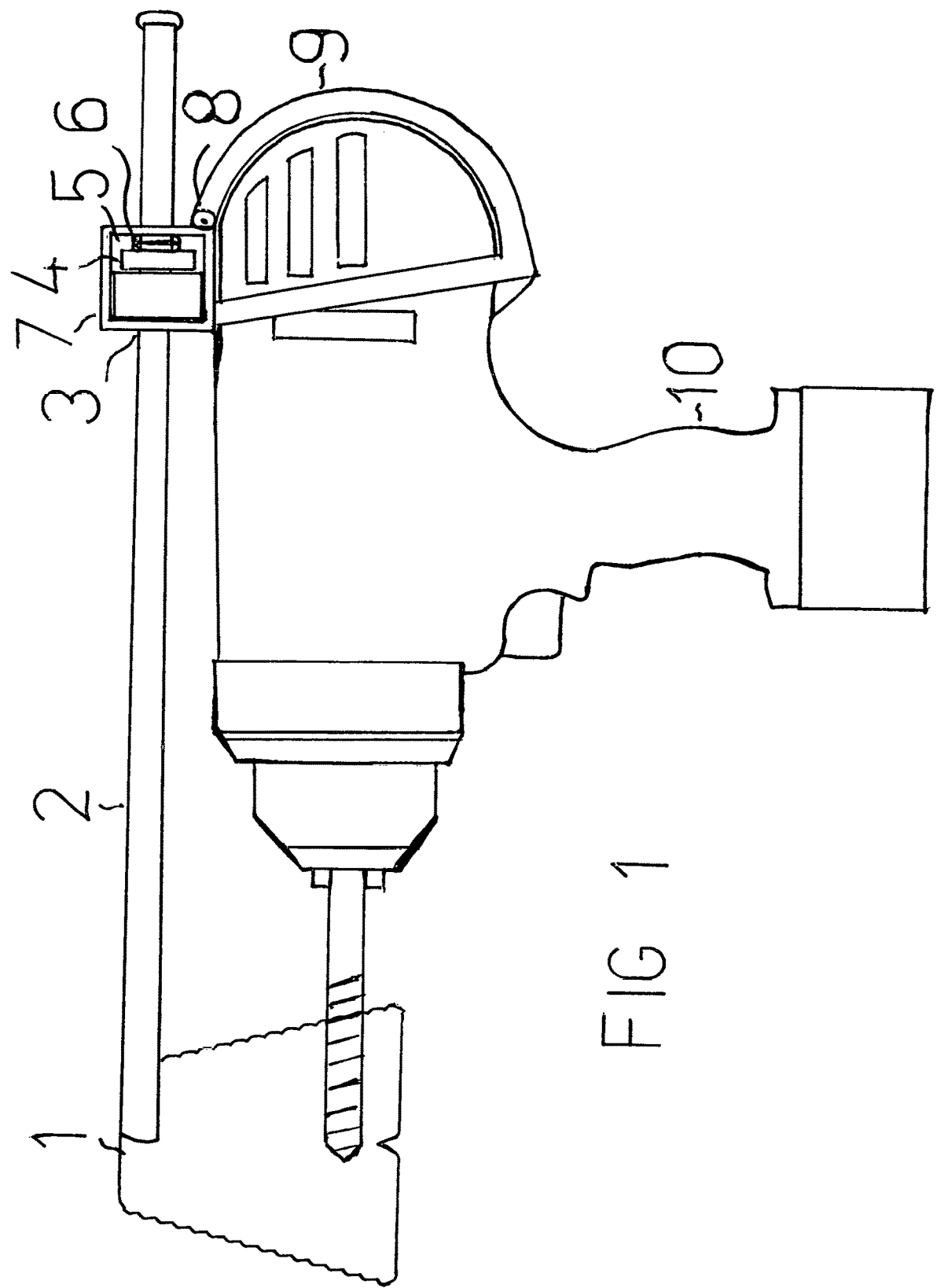
Figure 2:
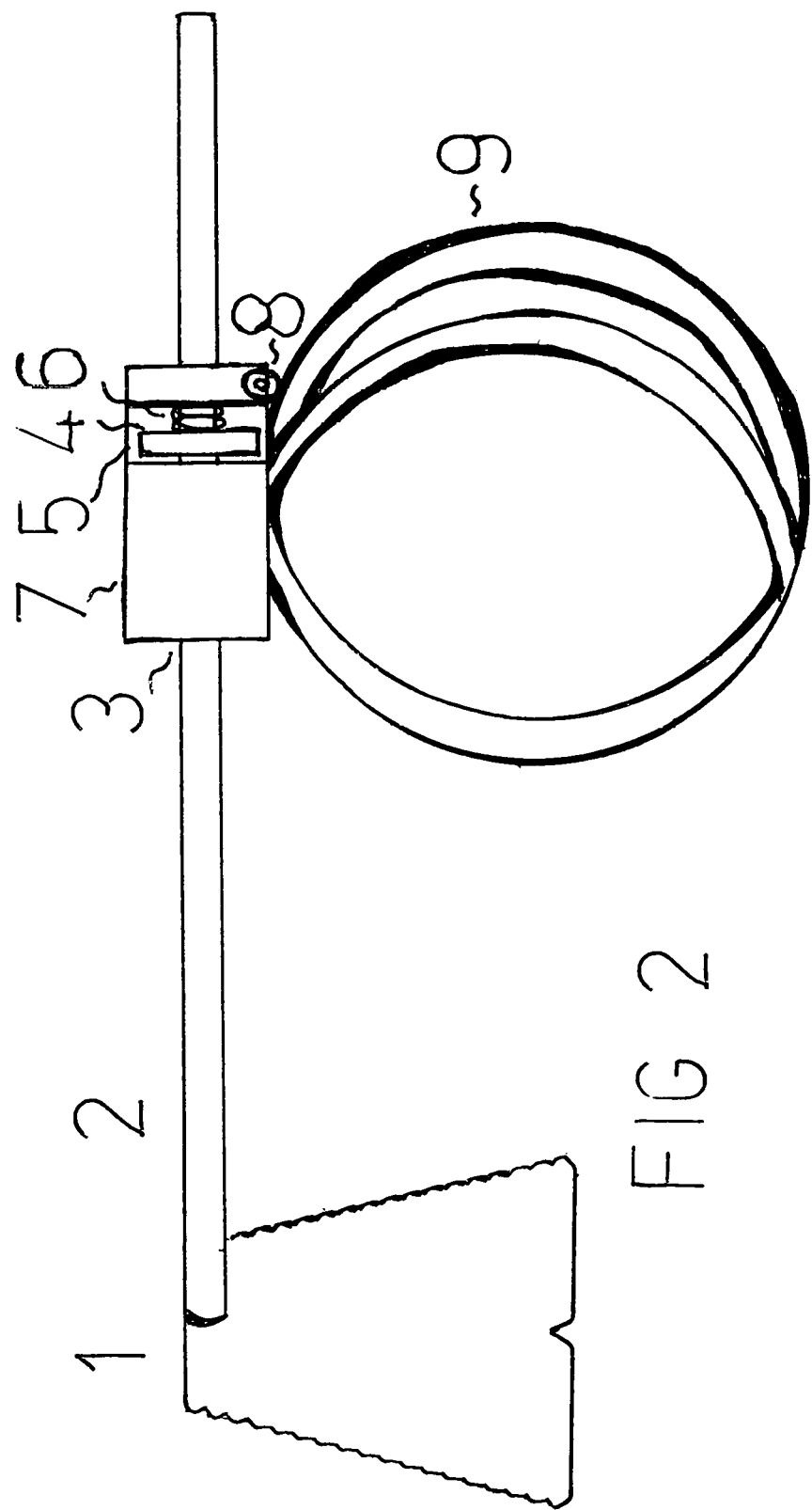
Figure 3:
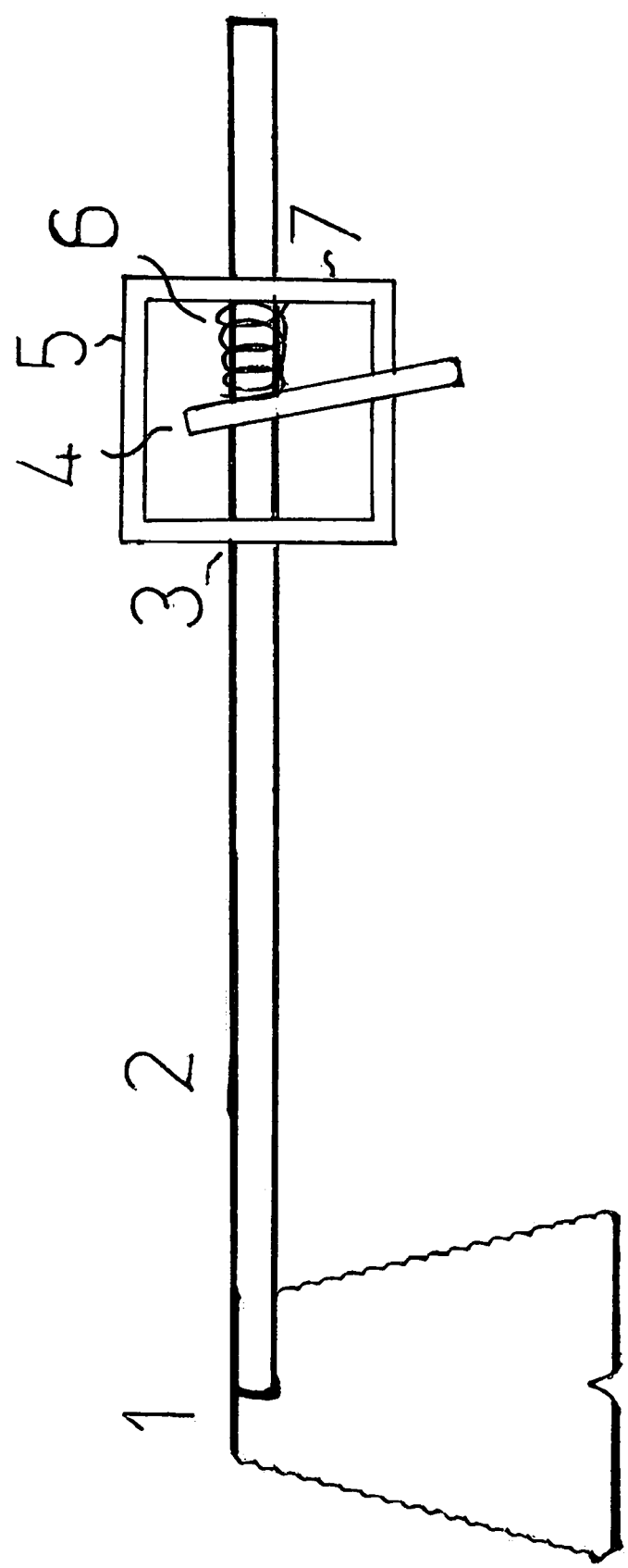

A small flat piece of metal called the base 1. The base slides behind the metal to be worked.

A bar that slides back and forth 2. This bar is welded to the base.

Two fixed holes drilled in the mount.

Locking wedge 4. This wedge stops the bar from sliding forward.

Cover 5. Covers all parts.

Spring 6. Pushes on the locking wedge keeping it locked at all times.

Mount 7. This is what all the parts are mounted to.

Hinge 8. This allows the drill to be farther away from where the base is hooked on.

Cradle 9. This mounts the attachment to the drill

Drill 10.

BRIEF DESCRIPTION OF THE INVENTION

This is an attachment that mounts on the back of a hand drill. This attachment turns a hand drill into a portable drill press. This compact portable drill press uses leverage to drill holes, unlike any other drill press. When the base and the drill bit are in place, the drill is sitting at a angle. When the drill is pulled straight, leverage is applied to the drill bit. This leverage allows an easier way to drill holes. The base pulls the metal to the drill bit, in this way leverage can be applied. It is easier to hold the drill straight when making a hole, than pushing on a drill. The drill acts as a lever and pivots off the base. The metal and bit are forced together, allowing you to draw a hole fast and easy.

This is an attachment for a hand held drill. This attachment will turn any hand held drill into a portable drill press.

U.S. Pat. No. 4,576,529 to Forrer shows a drill motor mounted on a bar for drilling a work piece, held against a jaw member. Forward force for drilling is provided by a threaded spindle engaging a threaded aperture and rotated by a spinning handle. The portable drill press that I am presenting, does not need a handle to tighten the drill bit to the metal.

U.S. Pat. No. 5,314,271 to Christiano shows a portable drill guide based on a welder clamp type locking pliers, it is used to drill out spot welds. The drill motor is mounted on one of the jaws perpendicular to the opposite jaw. The work piece is drilled between the end of the drill and the opposite jaw while the operator squeezes the locking pliers with one hand and is holding the drill with the other. Drilling in other applications is limited.

U.S. Pat. No. 5,885,036 to Wheeler is a clamp hooked to a drill. When the operator squeezes the trigger, the clamp will pull the drill bit to the work. The tool is big, making it hard get into tight spots.

FIGS. 1,2,3

2. This attachment is made by using a small metal bar, about two foot long and welding a small flat piece of metal to the end of it. Base 1, this flat piece of metal hooks to the back of the metal going to be drilled. Bar 2 is adjustable, making it possible to hook onto different sizes of metal. The locking mechanism 7 consist of a flat plate, with two metal fixed holes, inline with the drill, one inch apart enabling the bar to slide in it. There is a hole drilled 3 in the middle of the two fixed holes. This is where the locking wedge hinges. There is a piece of metal called the stop on the bottom of the locking wedge. It will sit in the hole between the fixed hole all inline. The bar that slides in the mount goes through the locking wedge and the fixed holes. This allows the locking wedge to rock back and forth, but locks it down so the bar can't move. The locking wedge 4 has a hole in it. When the bar is pulled, the locking wedge slides down at a angle. This shows locking the bar in place 2. There is a spring 6 pushing on the locking wedge, to keep it in lock mode all the time. The locking wedge 4 sticks out of the mount, like a button, this adjust the bar by pushing this button, it lifts the locking wedge straight, allowing the bar to slide freely back and forth. There is a cover 5 that goes on. The cover has two holes in it. The cover is a little bigger than the locking mechanism so it can slide over it. When the locking wedge is in place, and the spring is in place, put the cover on and slide the bar in the holes. The bar will slide into the cover hole first, then into one of the fixed holes. It then slides into the locking wedge and into the spring, out the other fixed hole and out the other hole in the cover. This hooks everything together, thus making it ready to use. This locking mechanism is mounted to the drill with a cradle 9. The locking mechanism and the cradle are hinged 8 together at the back, giving it the ability to have some up and down movement. This helps when taking the base 1 off, after the hole has been drilled. This also allows the drill to move farther away from the base. Meaning you can drill farther away from the edge of the steel. The cradle 9 is shaped just like the back of the drill. The cradle 9 slides onto the drill, and the one way locking mechanism is welded to the cradle. The locking mechanism can be built into a drill from the factory.

2 Slide the metal bar into the locking mechanism, and slide it into the desired position. The locking mechanism will not allow the bar to slide out unless you push the release button located on top of the locking mechanism. When you put this attachment on a drill, it becomes a portable drill press. Place the drill bit where you want it and lean the drill forward until the base hooks onto the metal. This attachment is set up to hook the base on to the back of the piece of metal you are drilling. The drill is ready to drill now.

The drill is hooked up to the metal and setting at a angle. When you pull the drill straight, leverage is applied to the drill bit. Turn the drill on and drill the hole faster and easier. What makes this drill press different from other drill presses is the use of leverage. Other drill presses, use a geared handle to apply force. There is no handle on this drill press. When the operator slides the base over the back side of a piece of metal, the drill bit will sit down onto the steel. The drill should be at a slight angle. When the drill is pulled straight, leverage is applied on the drill bit. If there is not enough leverage on the drill bit, take the base off the metal and tighten the base by pushing the base closer to the drill bit. Hook the drill back onto the metal to be drilled, and hold the drill straight and drill the hole.

The invention claimed is:

1. A compact, portable drill press attachment for attaching to a hand-held electric drill and to provide a drilling force between a drill bit and a metal workpiece, the drill press attachment comprising: a base made from a small, flat piece of metal, the base configured to slide into position behind the metal workpiece, the base comprising teeth cut into it for locking onto the workpiece; a rod-shaped bar that is welded to the base; a mount comprising a cover, the cover comprising two spaced, fixed holes configured to receive the rod-shaped bar therethrough; a locking mechanism comprising a locking wedge, the locking wedge comprising a hole for slidably receiving the rod-shaped bar, and a coil spring to provide a locking force to the locking wedge, the coil spring arranged such that the rod-shaped bar passes through it; a cradle shaped to cover a rear end of the electric drill in order to connect the drill press attachment to the drill, the cradle being connected to the drill press attachment by a hinge to allow for up and down movement; wherein the mount may be moved along the bar by pushing the locking wedge like a button to release the locking wedge such that the mount may be moved to a desired position based on the size of the workpiece; wherein when a load is put on the drill press attachment, the locking wedge locks onto the rod-shaped bar; wherein the drilling force is delivered from the drill bit to the metal workpiece when the drill press attachment and electric drill are moved from an angled, set position on the workpiece to a straight, drilling position; and wherein the drill press attachment does not require a moveable handle, trigger, or lever to apply the drilling force to the workpiece.

\* \* \* \* \*